(12) United States Patent
Persinger

(10) Patent No.: US 11,007,862 B2
(45) Date of Patent: May 18, 2021

(54) HYBRID MODULE INCLUDING ROTOR ADHESIVELY BONDED TO ROTOR CARRIER

(71) Applicant: Schaeffler Technologies AG & Co. KG, Herzogenaurach (DE)

(72) Inventor: Justin Persinger, Norton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 394 days.

(21) Appl. No.: 15/966,804

(22) Filed: Apr. 30, 2018

(65) Prior Publication Data
US 2019/0329641 A1 Oct. 31, 2019

(51) Int. Cl.
| | |
|---|---|
| *B60K 6/40* | (2007.10) |
| *F16D 25/0638* | (2006.01) |
| *F16D 13/52* | (2006.01) |
| *F16D 13/68* | (2006.01) |
| *F16H 45/02* | (2006.01) |
| *B60K 6/26* | (2007.10) |
| *H02K 1/27* | (2006.01) |
| *H02K 1/28* | (2006.01) |
| *H02K 1/32* | (2006.01) |
| *H02K 7/108* | (2006.01) |
| *H02K 15/03* | (2006.01) |

(52) U.S. Cl.
CPC .......... *B60K 6/40* (2013.01); *B60K 6/26* (2013.01); *F16D 13/52* (2013.01); *F16D 13/683* (2013.01); *F16D 25/0638* (2013.01); *F16H 45/02* (2013.01); *H02K 1/2733* (2013.01); *H02K 1/28* (2013.01); *H02K 1/32* (2013.01); *H02K 7/108* (2013.01); *H02K 15/03* (2013.01); *B60Y 2200/92* (2013.01); *F16H 2045/0284* (2013.01); *Y10S 903/906* (2013.01); *Y10S 903/951* (2013.01)

(58) Field of Classification Search
CPC ....... H02K 1/28–30; B60K 6/40; B60K 6/405
USPC ..................... 310/418–433, 52–65
See application file for complete search history.

(56) References Cited

U.S. PATENT DOCUMENTS

| | | | |
|---|---|---|---|
| 8,648,506 B2 * | 2/2014 | Bradfield | H02K 1/30 310/61 |
| 2006/0267447 A1 * | 11/2006 | Buttner | H02K 1/22 310/261.1 |
| 2012/0305226 A1 * | 12/2012 | Chamberlin | H02K 5/20 165/121 |
| 2015/0239336 A1 * | 8/2015 | Kasuya | B60L 50/16 74/661 |
| 2016/0109101 A1 | 4/2016 | Lindemann et al. | |

(Continued)

*Primary Examiner* — Quyen P Leung
*Assistant Examiner* — Minki Chang
(74) *Attorney, Agent, or Firm* — Davidson, Davidson & Kappel, LLC

(57) ABSTRACT

An electric motor includes a rotor rotatable about a center axis; and a rotor carrier including an outer circumferential surface having a varying diameter defined by radially inner surface sections and radially outer surface sections. The radially outer surface sections are bonded to an inner circumferential surface of the rotor by an adhesive. A hybrid module configured for arrangement in the torque path upstream from a transmission and downstream from an internal combustion engine includes the electric motor and a torque converter including a front cover. The rotor carrier is fixed to the front cover.

20 Claims, 3 Drawing Sheets

(56) References Cited

U.S. PATENT DOCUMENTS

2016/0263984 A1\* 9/2016 Kasuya .................... B60K 6/26
2018/0233975 A1\* 8/2018 Shimomura ........... H02K 7/075

\* cited by examiner

HYBRID MODULE INCLUDING ROTOR ADHESIVELY BONDED TO ROTOR CARRIER

The present disclosure relates generally to electric motor rotors and more specifically to electric motor rotors in hybrid modules.

BACKGROUND

Hybrid motor vehicle drive trains include a hybrid module having an electric motor including a rotor that is axially clamped to a rotor carrier.

SUMMARY OF THE INVENTION

An electric motor is provided including a rotor rotatable about a center axis; and a rotor carrier including an outer circumferential surface having a varying diameter defined by radially inner surface sections and radially outer surface sections. The radially outer surface sections are bonded to an inner circumferential surface of the rotor by an adhesive.

In embodiments of the electric motor, the outer circumferential surface of the rotor carrier may include radially extending surface sections connecting the radially inner surface sections and the radially outer surface sections. The radially inner surface sections may be spaced radially inward from the inner circumferential surface of the rotor such that the radially inner surface sections, the radially extending surface sections and the inner circumferential surface of the rotor may define a plurality of axially extending fluid flow channels. The rotor carrier may include an inner circumferential surface and a plurality of radially extending channels extending from the inner circumferential surface to the radially inner surface sections of the outer circumferential surface to merge with the axially extending fluid flow channels. The rotor carrier may include an inner circumferential surface having a varying diameter defined by radially inner surface sections, radially outer surface sections and radially extending surface sections. The radially extending surface sections may connect the radially inner surface sections and the radially outer surface sections. The radially inner surface sections and radially extending surface sections of the inner circumferential surface may define inner spline teeth. The radially inner surface sections of the outer circumferential surface may be aligned directly radially outside of the radially inner surface sections of the inner circumferential surface and the radially outer surface sections of the outer circumferential surface may be aligned directly radially outside of the radially outer surface sections of the inner circumferential surface. The rotor may include a plurality of annular rotor segments and each of rotor segments may be bonded to the radially outer surface sections by the adhesive.

A hybrid module configured for arrangement in the torque path upstream from a transmission and downstream from an internal combustion engine is also provided. The hybrid module includes the electric motor and a torque converter including a front cover. The rotor carrier is fixed to the front cover.

In embodiments of the hybrid module, the rotor carrier may be welded to the front cover by at least one weld. The at least one weld may join a radially extending annular surface of the rotor carrier to a radially extending surface of the front cover of the torque converter. The rotor may include a plurality of rotor segments. The rotor segments may consisting of a first end rotor segment defining a rear end of the rotor, a second end rotor segment defining a front end of the rotor and at least one internal rotor segment axially between the first end rotor segment and the second end rotor segment. The first end rotor segment may be axially spaced from the front cover. The hybrid module may include a spacer axially between the first end rotor segment and the front cover. The spacer may being formed of a non-magnetic material and the front cover may be formed of a magnetic material. The hybrid module may include clutch plates. The rotor carrier may include an inner circumferential surface having a varying diameter defined by radially inner surface sections, radially outer surface sections and radially extending surface sections. The radially extending surface sections may connect the radially inner surface sections and the radially outer surface sections. The radially inner surface sections and the radially extending surface sections of the inner circumferential surface may define inner spline teeth. The inner spline teeth may non-rotatably and axially slidably fix the clutch plates to the rotor carrier.

A method of constructing an electric motor is also provided. The method includes providing a rotor carrier including an outer circumferential surface having a varying diameter defined by radially inner surface sections and radially outer surface sections; and bonding an inner circumferential surface of a rotor to the radially outer surface sections by an adhesive.

In embodiments of the method, the outer circumferential surface of the rotor carrier may include radially extending surface sections connecting the radially inner surface sections and the radially outer surface sections. The radially inner surface sections may be spaced radially inward from the inner circumferential surface of the rotor such that the radially inner surface sections. The radially extending surface sections and the inner circumferential surface of the rotor may define a plurality of axially extending fluid flow channels. The rotor carrier may include an inner circumferential surface and a plurality of radially extending channels extending from the inner circumferential surface to the radially inner surface sections of the outer circumferential surface to merge with the axially extending fluid flow channels. The rotor carrier may include an inner circumferential surface having a varying diameter defined by radially inner surface sections, radially outer surface sections and radially extending surface sections. The radially extending surface sections may connect the radially inner surface sections and the radially outer surface sections. The radially inner surface sections and the radially extending surface sections of the inner circumferential surface may define inner spline teeth.

A method of constructing a hybrid module configured for arrangement in the torque path upstream from a transmission and downstream from an internal combustion engine is also provided. The method includes constructing the electric motor and fixing the rotor carrier to a front cover of the torque converter.

In embodiment of the method, the fixing of the rotor carrier to the front cover of the torque converter may be performed by welding the rotor carrier to the front cover. The rotor may include a plurality of rotor segments. The rotor segments may consist of a first end rotor segment defining a rear end of the rotor, a second end rotor segment defining a front end of the rotor and at least one internal rotor segment axially between the first end rotor segment and the second end rotor segment. The first end rotor segment may be axially spaced from the front cover by a spacer formed of non-magnetic material or by an air gap. The rotor carrier may include inner spline teeth. The method may further include non-rotatably and axially slidably fixing clutch plates to the rotor carrier via the inner spline teeth.

BRIEF DESCRIPTION OF THE DRAWINGS

The present disclosure is described below by reference to the following drawings, in which.

DETAILED DESCRIPTION

The present disclosure provides a hybrid module in which an adhesive bonds the rotor segments to the rotor carrier, the rotor carrier is welded to the torque converter cover, and a preferred relationship is provided between the rotor carrier internal spline teeth (interface with the clutch assembly) and rotor carrier external cooling flow grooves. The welding can be friction welding or laser welding in embodiments. The adhesive bonding of the rotors to the rotor carrier is sufficient to transfer torque from the rotor segments to the rotor carrier without slipping, without the need to provide and maintain high axial clamp force (25 kN to 50 kN) during installation and operational life. Slipping is prevented to specifically insure that the rotor segments do not move relative to the rotor carrier thus insuring a constant air gap between the rotor segments and stator, which may results in improved motor efficiency and performance. The adhesive bonding accomplishes this during operating temperature extremes ranging from –40 C to 150 C.

The hybrid module of the present disclosure may have the following advantages:

the rotor carrier can be manufactured from techniques other than ductile iron casting, eliminating shrink-fit end ring and installation process requiring heating to 300 C, eliminating ductile cast iron staking process and any associated durability issues, eliminating the process of riveting the rotor carrier to the torque converter front cover and any associated durability issues, eliminating an installation process requiring 25 kN to 50 kN axial clamp force and any associated durability issues, allowing a lowest possible stress induced on rotor segments, which may result in the lower iron losses and higher e-motor efficiency, adhesive bonding can tolerate a high amount of misalignment between rotor and rotor carrier, reductions of size, length, mass, inertia, and presumably cost may be achieved for the hybrid module.

Figure 1:
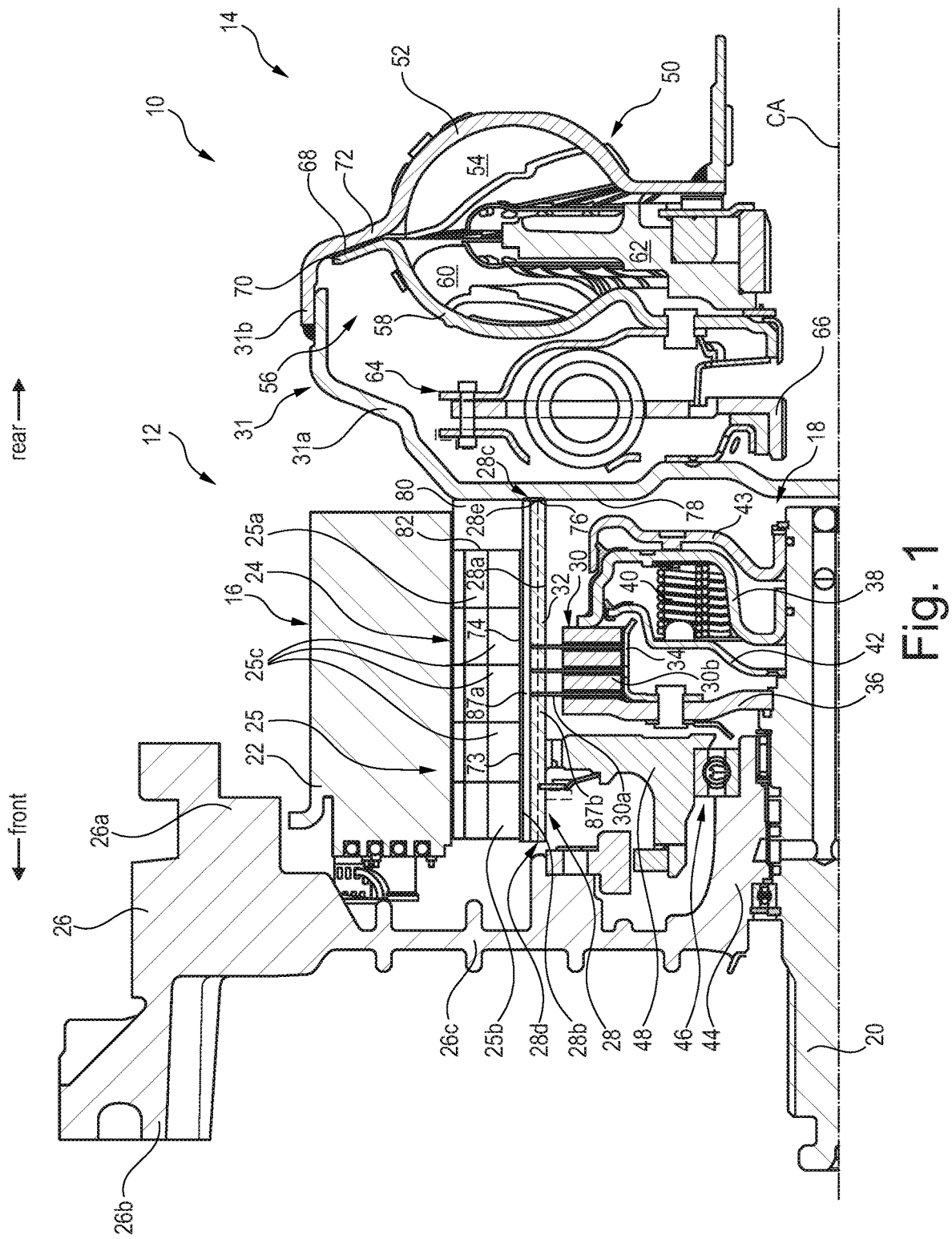
FIG. 1 shows a hybrid module in accordance with an embodiment of the present disclosure.

FIG. 1 shows hybrid module 10 in accordance with an embodiment of the present invention. Module 10 includes a hybrid drive unit 12 configured for attachment to an internal combustion engine and a torque converter 14 configured for attachment to a transmission input shaft. In a known manner, hybrid drive unit 12 is selectively operable to transmit torque from the internal combustion engine to torque converter 14 or directly drive torque converter 14 via an electric motor 16 of drive unit 12. Along these lines, hybrid drive unit 12 includes an engine connect/disconnect clutch 18 for selectively connecting torque converter 14 to an input shaft 20, which is configured for non-rotatably connecting for example via a flywheel to a crankshaft of the internal combustion engine, or disconnecting torque converter 14 from input shaft 20 such that torque converter can be driven solely by electric motor 16.

Electric motor 16 includes a stator 22 and a rotor 24, with stator 22 being fixed to a housing 26 of hybrid drive unit 12 at an axially protruding transmission side flange 26a of housing 26. Housing 26 further includes an axially protruding engine side flange 26b protruding opposite of flange 26a. Upon current being provided to coils of stator 22, rotor 24 is rotated about a center axis CA of hybrid module 10 in a known manner, due to rotor 24 including a plurality of annular rotor segments 25, which in at least some preferred embodiments are formed by permanent magnets, that are energized by the current in the coils. The terms axially, radially and circumferentially as used herein are used with respect to center axis CA. Rotor 24 is non-rotatably fixed to a rotor carrier 28, which has a cylindrical shape, such that rotor 24 and rotor carrier rotate together about center axis CA Clutch 18 includes a plurality of clutch plates 30, at least some of which are supported in an axially slidable manner at outer diameter ends thereof by splines 32 formed on an inner circumferential surface 28a of rotor carrier 28. More specifically, plates 30 include outer splined clutch plates 30a that include outer splines received between inner spline teeth 87b so plates 30a are supported in an axially slidable manner at the diameter thereof. Clutch plates 30 also include inner splined clutch plates 30b that include inner splines so plates 30b are supported in an axially slidable manner at the diameter thereof by an inner support 34 that is fixed to a counter pressure plate 36, which is nonrotatably fixed to shaft 20. Clutch 18 further includes a piston 38 that is axially slidable along an outer circumference of shaft 20 to engage and disengage clutch 18 based on fluid pressure differences on front and rear sides of piston 38. When piston 38 forces clutch plates 30 against counter pressure plate 36, clutch 18 is engaged and torque from shaft 20 is transmitted through clutch plates 30 into rotor carrier 28, which then transmits the received torque to damper assembly 14. Piston 38 is held axially away from clutch plates 30 by a spring 40 supported by a support plate 42. Piston 38 is also resiliently connected to a liftoff control plate 43 that limits the liftoff of piston 38 with respect to clutch plates 30.

Housing 26 includes an axially extending protrusion 44 provided on an engine side of clutch 18 radially outside of shaft 20. Protrusion 44 supports a ball bearing 46, which rotatably supports a rotor flange 48 on protrusion 44. An inner race of ball bearing 46 sits on an outer circumferential surface of protrusion 44 and rotor flange 48 extends from an outer circumferential surface of the outer race of ball bearing 46 to rotor carrier 28.

Torque converter 14 includes a front cover 31a and a rear cover 31b together forming cover 31, with fasteners 29 passing axially through a radially extending section of front cover 31a, which extends radially inward to intersect center axis CA. Rear cover 31b includes forms an impeller shell 50 of an impeller 52 that includes a plurality of impeller blades 54, which are supported by a rounded blade supporting portion 50a of impeller shell 50, which is shaped as an annular bowl and contacts rear edges of impeller blades 54.

Torque converter 14 also includes a turbine 56 configured to define a piston that is axially moveable toward and away from impeller shell 50 such that an engagement section of turbine 56 engages an engagement section of impeller shell 50 so as to form a lockup clutch. Turbine 56 includes a turbine shell 58 supporting a plurality of turbine blades 60. Torque converter 14 also includes a stator 62 axially between turbine 56 and impeller 52 to redirect fluid flowing from the turbine blades 60 before the fluid reaches impeller blades 54 to increase the efficiency of torque converter 14. Torque converter 14 further includes a damper assembly 64 fixed to turbine shell 58. Damper assembly 64 is configured for receiving torque from turbine shell 58 and transferring torque to the transmission input shaft. For transferring torque to the transmission input shaft, damper assembly 64 includes a support hub 66, which includes a splined inner circumferential surface for non-rotatably connecting to an outer circumferential surface of the transmission input shaft.

A friction material 68 is bonded onto a radially extending impeller facing surface of an outer radial extension 70 of turbine shell 58, which is radially outside of blades 60 and forms the engagement section of turbine 56, for engaging a radially extending wall 72 of impeller shell 50, which is radially outside of blades 54 and forms the engagement section of impeller shell 50. In other embodiments, instead of or in addition to being bonded to outer radial extension 70, friction material 68 may be bonded to radially extending turbine facing surface of radially extending wall 72 or to one or more additional discs between radially extension 70 and wall 72. Regardless of whether friction material 68 is bonded to outer radial extension 70, radially extending wall 72 or one or more additional discs, friction material 68 is provided axially between extension 70 and wall 72 to selectively rotationally engage the engagement section of turbine piston 56 with the engagement section of impeller shell 50. Torque converter 14 receives torque input from hybrid drive unit 12 through fasteners 29 at front cover 31a, which is transmitted to impeller 52. Impeller 52 drives turbine 56 via fluid flow from impeller blades 54 to turbine blades 60, when the lockup clutch is disengaged, or via friction material 68, when the lockup clutch is engaged. Turbine 56 then drives damper assembly 64, which in turn drives the transmission input shaft.

Referring back to electric motor 16, rotor segments 25 are bonded by an adhesive 73 at their inner circumferential surfaces 74 to portions of an outer circumferential surface 28b of rotor carrier 28. In some preferred embodiments, rotor carrier 28 is formed of steel, aluminum, or other ductile structural material. Rotor carrier 28 may be manufactured by forming processes such stamping, deep-drawing, extrusion, forging, flow-forming, spin-forming, grob forming, or roller die forming and machining processes such as broaching, thus eliminating the need for casting. Torque converter 14 is fixed to hybrid drive unit 12 at a first axial end 28c of rotor carrier 28 by at least one weld 76. More specifically, first axial end 28c of rotor carrier 28 includes a flat continuous annular surface 28e, which extends from inner circumferential surface 28a to outer circumferential surface 28b, that is welded to a flat radially extending surface 78 of torque converter front cover 31a. In some preferred embodiment, torque converter cover 31a is formed of a magnetic material, which in one preferred embodiment is a high strength low alloy steel. A second axial end 28b of rotor carrier 28 forms a free end of rotor carrier 28 that faces a radially extending section 26c of housing 26. Radially extending section 26c of housing 26 extends radially outward from protrusion 44 to flanges 26a, 26b.

FIG. 1 shows five rotor segments 25, but in other embodiments rotor 24 may include more or less than five segments 25. Segments 25 are a first end segment 25a—i.e., a rearmost segment, a second end segment 25b—i.e., a frontmost segment, and interior segments 25c provided axially between end segments 25a, 25b. A spacer 80 is provided axially between first end segment 25a and front cover 31a to space first end segment 25a from front cover 31a. Spacer 80 is a ring that axially abuts surface 78 of front cover 31a and a radially extending surface 82 of first end segment 25a. Spacer 80 is formed of a non-magnetic material and serves to magnetically isolate the rotor segments 25 from the torque converter cover 31a, which as noted above may be preferably constructed from magnetic materials. Spacer 80 may be designed to enable later material addition or removal for the purpose of balancing the rotating parts connected to rotor 24. In some embodiments, spacer 80 may be provided with coolant flow passages passing therethrough that align with axially extending fluid flow channels 86 (FIG. 3) to supply fluid for flowing along inner circumferential surfaces 74 of rotor segments 25. In some preferred embodiments, spacer 80 is die cast aluminum or other non-magnetic materials. Spacer 80 can be fixed to rotor carrier 28 by adhesive or in another manner, such as via friction. In an alternative embodiment, spacer 80 is omitted and an air gap is provided axially between surface 78 of front cover 31a and radially extending surface 82 of first end segment 25a.

Figure 2:
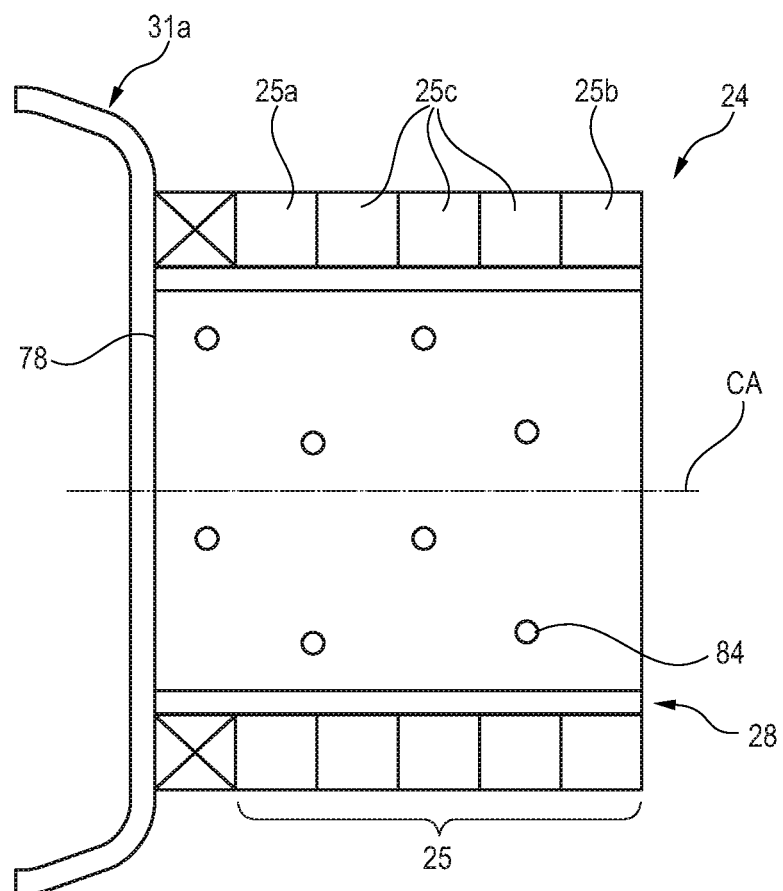
FIG. 2 schematically shows a radial cross-sectional view illustrating the construction of a rotor, a rotor carrier and a portion of a torque converter front cover of the hybrid module shown in FIG. 1.
Figure 3:
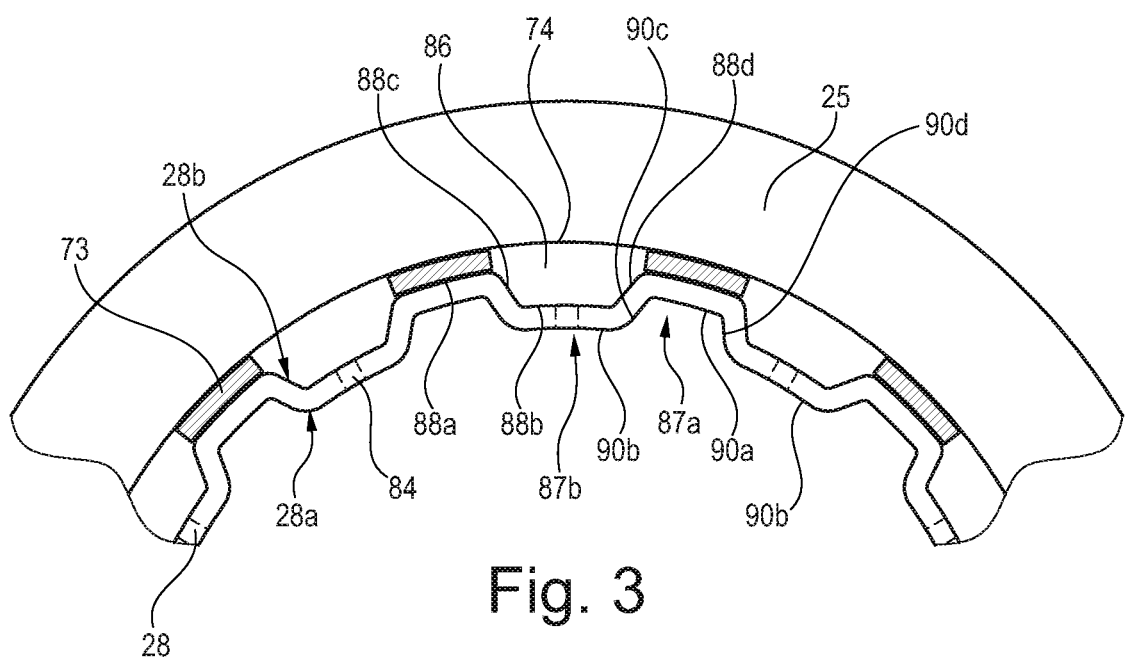
FIG. 3 schematically shows an axial cross-sectional view illustrating the construction of the rotor and the rotor carrier of the hybrid module shown in FIG. 1.

FIGS. 2 and 3 schematically show the construction of rotor 24, rotor carrier 28 and a portion of front cover 31a. As shown by viewing FIGS. 2 and 3 together, rotor carrier 28 includes a plurality of radially extending flow holes 84 formed therein that extend from inner circumferential surface 28a to outer circumferential surface 28b for allowing fluid to flow from radially inside of rotor carrier 28 to axially extending fluid flow channels 86 formed radially between outer circumferential surface 28b of rotor carrier 28 and inner circumferential surfaces 74 of rotor segments 25. As shown in FIG. 3, rotor carrier 28 includes a plurality of outer spline teeth 87a and a plurality of inner spline teeth 87b. In some preferred embodiments, rotor carrier 28 has approximately (+/−10%) a constant material thickness. Outer spline teeth 87a are fixed to inner circumferential surfaces 74 of rotor segments 25 by adhesive 73 and inner spline teeth 87b receive correspondingly shaped outer spline teeth on outer circumferential surfaces of clutch plates 30a.

To define the outer spline teeth 87a, outer circumferential surface 28b of rotor carrier 28 has a varying diameter such that surface 28b includes radially outer surface sections 88a that are bonded to inner circumferential surfaces 74 via adhesive 73 and radially inner surface sections 88b that are spaced radially inward from sections 88a and delimit a radially inner edge of channels 86. Sections 88a, 88b alternate in the circumferential direction, with each section 88b being connected to one adjacent section 88a by a radially extending surface section 88c and being connected to the other adjacent section 88a by a radially extending surface section 88d. Sections 88b are spaced radially inward from inner circumferential surfaces 74. Each channel 86 is radially and circumferentially delimited by one section 88a, one section 88b, one section 88c and the inner circumferential surface 74 of rotor sections 25. Sections 88b, 88c, 88d define teeth 87a.

To define the inner spline teeth 87b, inner circumferential surface 28a of rotor carrier 28 also has a varying diameter.

The varying diameter is formed such that surface 28a includes radially outer surface sections 90a and radially inner surface sections 90b that are spaced radially inward from sections 90a and delimit an innermost surface that is broached to form splines 32. Sections 90a, 90b alternate in the circumferential direction, with each section 90b being connected to one adjacent section 90a by a radially extending surface section 90c and being connected to the other adjacent section 90a by a radially extending surface section 90d. Sections 90b, 90c, 90d define teeth 87b. Radially inner surface sections 88b of the outer circumferential surface 28b are aligned directly radially outside of the radially inner surface sections 90b of the inner circumferential surface 28a and the radially outer surface sections 88a of the outer circumferential surface 28b are aligned directly radially outside of the radially outer surface sections 90a of the inner circumferential surface 28a.

Figure 4A:
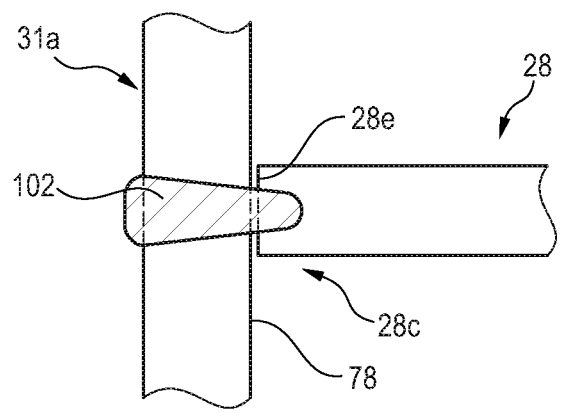
FIG. 4a schematically shows the rotor carrier being fixed to torque converter front cover by a lap weld.
Figure 4B:
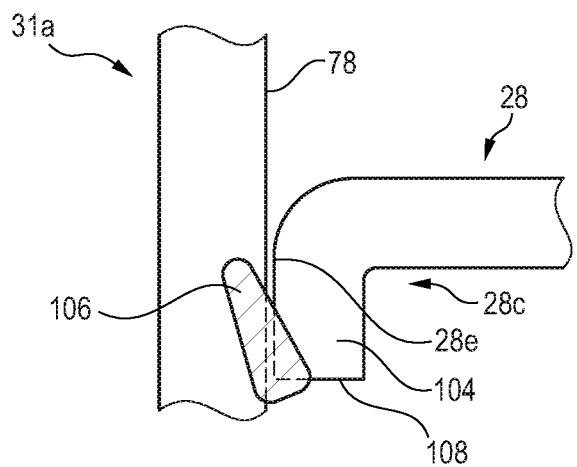
FIG. 4b schematically shows the rotor carrier being fixed to torque converter front cover by an angled laser weld.
Figure 4C:
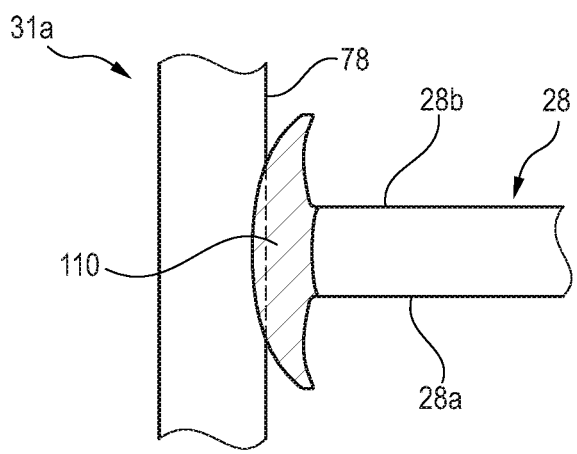
FIG. 4c schematically shows the rotor carrier being fixed to torque converter front cover by a friction weld.

FIGS. 4a to 4c show how the rotor carrier 28 is welded to the front cover 31a of torque converter 14 in different embodiments of the present disclosure. In FIG. 4a, first axial end 28c of rotor carrier 28 is fixed to front cover 31a by a lap weld 102 extending through front cover 31a to surface 28e of rotor carrier 28 to fix surface 78 of cover 31a to surface 28e of rotor carrier 28. In FIG. 4b, first axial end 28c includes a radially inwardly extending annular flange 104 that is fixed to front cover 31a by an angled laser weld 106 extending radially outward from an inner circumferential surface 108 of flange 104 to surface 28e of rotor carrier 28 and surface 78 of cover 31a to fix surface 78 of cover 31a to surface 28e of rotor carrier 28. In FIG. 4c, first axial end 28c of rotor carrier 28 is fixed to front cover 31a by a friction weld 110 extending through radially inward past inner circumferential surface 28a and radially outward past outer circumferential surface 28b to fix surface 78 of cover 31a to surface 28e of rotor carrier 28.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
10 hybrid module
12 hybrid drive unit
14 torque converter
16 electric motor
18 engine connect/disconnect clutch
20 input shaft
22 stator
22a outer circumferential surface
24 rotor
25, 25a to 25e rotor segments
26 housing
26a axially protruding transmission side flange
26b axially protruding engine side flange
26c radially extending housing section
28 rotor carrier
28a inner circumferential surface
28b outer circumferential surface
28c first axial end
28d second axial end
28e flat continuous annular surface
30 clutch plates
30a outer splined clutch plates
30b outer splined clutch plates
31 cover
31a front cover
31b rear cover
32 splines
34 inner support
36 counter pressure plate
38 piston
40 spring
42 support plate
43 liftoff control plate
44 housing protrusion
46 ball bearing
48 rotor flange
50 impeller shell
50a rounded blade supporting portion
52 impeller
54 impeller blades
56 turbine
58 turbine shell
60 turbine blades
62 stator
64 damper assembly
66 support hub
68 friction material
70 outer radial extension
72 radially extending wall
73 adhesive
74 inner circumferential surfaces
76 weld
78 flat radially extending surface
80 spacer
82 radially extending surface
84 radially extending flow holes
86 axially extending fluid flow channels
87a outer spline teeth
87b inner spline teeth
88a radially outer surface sections
88b radially inner surface sections
88c, 88d radially extending surface sections
90a radially outer surface sections
90b radially inner surface sections
90c, 90d radially extending surface sections
102 lap weld
104 radially inwardly extending annular flange
106 laser weld
108 inner circumferential surface
110 friction weld

What is claimed is:

1. An electric motor comprising:
a rotor rotatable about a center axis; and
a rotor carrier including an outer circumferential surface having a varying diameter defined by circumferentially alternating radially inner surface sections and radially outer surface sections, the radially outer surface sections being bonded to an inner circumferential surface of the rotor by an adhesive, the radially inner surface sections each being radially spaced from the inner circumferential surface of the rotor to radially delimit a plurality of circumferentially spaced axially extending fluid flow channels, each radially inner surface section radially delimiting a respective one of the axially extending fluid flow channels with the inner circumferential surface of the rotor.

2. The electric motor as recited in claim 1 wherein the outer circumferential surface of the rotor carrier includes radially extending surface sections connecting the radially inner surface sections and the radially outer surface sections such that each of the axially extending fluid flow channels is circumferentially delimited by two of the radially extending surface sections.

3. The electric motor as recited in claim 2 wherein the rotor carrier includes an inner circumferential surface and a plurality of flow holes extending from the inner circumferential surface to the radially inner surface sections of the outer circumferential surface to merge with the axially extending fluid flow channels.

4. The electric motor as recited in claim 1 wherein the rotor carrier includes an inner circumferential surface having a varying diameter defined by radially inner surface sections, radially outer surface sections and radially extending surface sections, the radially extending surface sections of the inner circumferential surface connecting the radially inner surface sections of the inner circumferential surface and the radially outer surface sections of the inner circumferential surface, the radially inner surface sections of the inner circumferential surface and the radially extending surface sections of the inner circumferential surface defining inner spline teeth.

5. The electric motor as recited in claim 1 wherein the rotor includes a plurality of annular rotor segments, each of the annular rotor segments being bonded to the radially outer surface sections by the adhesive.

6. A hybrid module configured for arrangement in the torque path upstream from a transmission and downstream from an internal combustion engine, the hybrid module comprising:
the electric motor as recited in claim 1; and
a torque converter including a front cover, the rotor carrier being fixed to the front cover.

7. The hybrid module as recited in claim 6 wherein the rotor carrier is welded to the front cover by at least one weld.

8. The hybrid module as recited in claim 7 wherein the at least one weld joins a radially extending annular surface of the rotor carrier to a radially extending surface of the front cover of the torque converter.

9. The hybrid module as recited in claim 6 wherein the rotor includes a plurality of rotor segments, the rotor segments consisting of a first end rotor segment defining a rear end of the rotor, a second end rotor segment defining a front end of the rotor and at least one internal rotor segment axially between the first end rotor segment and the second end rotor segment, the first end rotor segment being axially spaced from the front cover.

10. The hybrid module as recited in claim 9 further comprising a spacer axially between the first end rotor segment and the front cover, the spacer being formed of a non-magnetic material, the front cover being formed of a magnetic material.

11. The hybrid module as recited in claim 6 further comprising clutch plates, the rotor carrier including an inner circumferential surface having a varying diameter defined by radially inner surface sections, radially outer surface sections and radially extending surface sections, the radially extending surface sections of the inner circumferential surface connecting the radially inner surface sections of the inner circumferential surface and the radially outer surface sections of the inner circumferential surface, the radially inner surface sections of the inner circumferential surface and the radially extending surface sections of the inner circumferential surface defining inner spline teeth, the inner spline teeth non-rotatably and axially slidably fixing the clutch plates to the rotor carrier.

12. An electric motor comprising:
a rotor rotatable about a center axis; and
a rotor carrier including an outer circumferential surface having a varying diameter defined by radially inner surface sections and radially outer surface sections, the radially outer surface sections being bonded to an inner circumferential surface of the rotor by an adhesive,
wherein the rotor carrier includes an inner circumferential surface having a varying diameter defined by radially inner surface sections, radially outer surface sections and radially extending surface sections, the radially extending surface sections of the inner circumferential surface connecting the radially inner surface sections of the inner circumferential surface and the radially outer surface sections of the inner circumferential surface, the radially inner surface sections of the inner circumferential surface and the radially extending surface sections of the inner circumferential surface defining inner spline teeth,
wherein the radially inner surface sections of the outer circumferential surface of the rotor carrier are aligned directly radially outside of the radially inner surface sections of the inner circumferential surface of the rotor carrier and the radially outer surface sections of the outer circumferential surface of the rotor carrier are aligned directly radially outside of the radially outer surface sections of the inner circumferential surface of the rotor carrier.

13. A method of constructing an electric motor comprising:
providing a rotor carrier including an outer circumferential surface having a varying diameter defined by a plurality of outer splined teeth including radially inner surface sections and radially outer surface sections; and
bonding an inner circumferential surface of a rotor to the radially outer surface sections by an adhesive to define a plurality of circumferentially spaced axially extending channels radially between the inner circumferential surface of the rotor and the radially inner surface sections and circumferentially between the outer spline teeth.

14. The method as recited in claim 13 wherein the outer spline teeth include radially extending surface sections connecting the radially inner surface sections and the radially outer surface sections.

15. The method as recited in claim 14 wherein the rotor carrier includes an inner circumferential surface and a plurality of flow holes extending from the inner circumferential surface to the radially inner surface sections of the outer circumferential surface to merge with the axially extending fluid flow channels.

16. The method as recited in claim 13 wherein the rotor carrier includes an inner circumferential surface having a varying diameter defined by radially inner surface sections, radially outer surface sections and radially extending surface sections, the radially extending surface sections of the inner circumferential surface connecting the radially inner surface sections of the inner circumferential surface and the radially outer surface sections of the inner circumferential surface, the radially inner surface sections of the inner circumferential surface and radially extending surface sections of the inner circumferential surface defining inner spline teeth.

17. A method of constructing a hybrid module configured for arrangement in the torque path upstream from a transmission and downstream from an internal combustion engine, the hybrid module comprising:

constructing the electric motor in accordance with the method as recited in claim 13; and fixing the rotor carrier to a front cover of a torque converter.

18. The method as recited in claim 17 wherein the fixing of the rotor carrier to the front cover of the torque converter is performed by welding the rotor carrier to the front cover.

19. The method as recited in claim 17 wherein the rotor includes a plurality of rotor segments, the rotor segments consisting of a first end rotor segment defining a rear end of the rotor, a second end rotor segment defining a front end of the rotor and at least one internal rotor segment axially between the first end rotor segment and the second end rotor segment, the first end rotor segment being axially spaced from the front cover by a spacer formed of non-magnetic material or by an air gap.

20. The hybrid module as recited in claim 13 wherein the rotor carrier includes inner spline teeth, the method further comprising non-rotatably and axially slidably fixing clutch plates to the rotor carrier via the inner spline teeth.

\* \* \* \* \*